(12) United States Patent
Ellis

(10) Patent No.: US 9,360,368 B1
(45) Date of Patent: Jun. 7, 2016

(54) SYSTEM AND METHOD FOR CHARACTERIZING POLARIMETRIC RESPONSE OF A REMOTE SENSING INSTRUMENT

(71) Applicant: EXELIS, INC., McLean, VA (US)

(72) Inventor: Kenneth K. Ellis, Columbia City, IN (US)

(73) Assignee: Exelis, Inc., Herndon, VA (US)

( * ) Notice: Subject to any disclaimer, the term of this patent is extended or adjusted under 35 U.S.C. 154(b) by 145 days.

(21) Appl. No.: 14/306,521

(22) Filed: Jun. 17, 2014

(51) Int. Cl.
*G01J 4/00* (2006.01)
*G01J 4/04* (2006.01)

(52) U.S. Cl.
CPC .......................................... *G01J 4/04* (2013.01)

(58) Field of Classification Search
CPC ..................................... G01J 4/00; G01J 4/04
USPC ........................................................ 356/367
See application file for complete search history.

(56) References Cited

U.S. PATENT DOCUMENTS

| | | | | |
|---|---|---|---|---|
| 5,296,913 A | * | 3/1994 | Heffner | G01J 4/04 356/364 |
| 6,917,427 B2 | * | 7/2005 | Krause | G01J 4/04 356/364 |
| 7,612,880 B2 | | 11/2009 | Chipman | |
| 2015/0157246 A1 | * | 6/2015 | Leszinske | G01N 21/21 600/316 |

OTHER PUBLICATIONS

Zhang, Xusheng; Wang,Haoyu; and He, Chuan; "Analysis on the Effect of Extinction Ratio in Birefringent Measurement by Phase-Stepping Method", School of Optoelectronics, Beijing Institute of Techology, Beijing, China, Proc. of SPIE Vo. 8557, 85572e, Year 2012.

Azzam, R.M.A.; "Photopolarimetric Measurement of the Mueller Matrix by Fourier Analysis of a Single Detected Signal"; Optical Society of America; Optics Letters, vol. 2, No. 6, Jun. 1978.

\* cited by examiner

*Primary Examiner* — Roy M Punnoose
(74) *Attorney, Agent, or Firm* — RatnerPrestia

(57) ABSTRACT

Measuring the polarimetric response of an optical instrument includes the steps of: emitting light along an optical axis; receiving the light through first and second polarizers; and detecting the light received through the first and second polarizers, using a filter and a detector. A first set of measurements is obtained by measuring the intensity of light received through the first and second polarizers. A second set of measurements is obtained by placing an optical instrument along the optical axis in lieu of the filter and detector; and measuring the intensity of light received through the first polarizer, after the second polarizer has been removed. A third set of measurements is obtained using the optical instrument but having the second polarizer replace the first polarizer. The optical instrument may be characterized using the first, second and third sets of measurements. The characterization is completed without having to know the extinction ratios and the transmittance parameters of the polarizers.

6 Claims, 4 Drawing Sheets

SYSTEM AND METHOD FOR CHARACTERIZING POLARIMETRIC RESPONSE OF A REMOTE SENSING INSTRUMENT

FIELD OF THE INVENTION

The present invention relates, in general, to polarimetric response of an instrument to light. More specifically, the present invention relates to characterizing or calibrating an optical instrument to polarization of light that is emitted, scattered, reflected, or transmitted by an object.

BACKGROUND OF THE INVENTION

As a general rule, an instrument that measures optical properties of an object is sensitive to the polarization of light that is emitted, scattered, reflected, or transmitted by an object. The polarization sensitivity of an optical instrument may be desirable so that it can characterize the polarization of light from an object. It may also be desirable that the instrument be insensitive to polarization. Either way, a common need exists to characterize the polarization sensitivity of an optical instrument with a specified level of calibration accuracy.

One approach to characterizing the polarimetric response of an optical instrument is to place a linear polarizer between a source of known radiance and an optical aperture of the instrument; the polarizer is then rotated through one or more angles while the instrument collects data. If the transmittance and the extinction ratio of the linear polarizer are known, the polarimetric response of the instrument may be determined.

There are two shortcomings to the aforementioned approach. First, real linear polarizers are not perfect polarizers. While most of the light transmitted through the polarizer may be of desired polarization, transmittance of the orthogonal polarization of light may not be zero. The ratio of the transmittance amplitudes of the two orthogonal polarizations is called the 'extinction ratio'. The extinction ratio may be very high, but uncertainties in its value, nevertheless, may introduce errors in the measured polarization response of the instrument. Second, uncertainty in the transmittance of a desired polarization may also introduce an error into the measured polarization response of the instrument.

Zhang et al. (Xusheng Zhang, Haoyu Wang, and Chuan He, "Analysis on the effect of extinction ratio in birefringent measurement by phase-stepping method", Proc. SPIE Vol. 8557, *Optical Design and Testing V*, 2012), have developed a method for measuring the polarimetric transmittance of an optical element that is independent of transmittance and extinction ratio. This eliminates two sources of error from the measurements. This method, however, is not practical for end-to-end characterization of a remote sensing instrument. An end-to-end characterization of the remote sensing instrument requires access to its exit port located at the end of the instrument's optical path, which is typically located deep inside the instrument.

A need still exists to characterize or calibrate an optical instrument by measuring its polarimetric response to light that is emitted, scattered, reflected, or transmitted by an object. As will be explained, the present invention provides a system and a method for measuring the polarimetric transmittance of an optical instrument to a high level of accuracy by reducing two sources of errors, namely, transmittance amplitude error and extinction ratio error. As will be explained, the present invention is effective in characterizing an optical instrument without the need to know the transmittance amplitude and extinction ratio of a polarizer disposed in the optical path of the instrument under test.

SUMMARY OF THE INVENTION

To meet this and other needs, and in view of its purposes, the present invention provides a system for characterizing polarimetric response of an optical instrument. The system includes: a light source for emitting light along an optical axis; at least one of first and second polarizers disposed perpendicularly to the optical axis, for receiving light emitted from the light source; and a spectral filter and an optical detector, defined as a first sub-system, for receiving light transmitted through the at least one of the first and second polarizers. In addition, an optical instrument, defined as a second sub-system, is selected to replace the first sub-system, for receiving light transmitted thorough the at least one of the polarizers. The first sub-system is configured to obtain a first set of measurements based on the light received through the first and second polarizers. Next, the first polarizer only is disposed in the optical axis, and the second sub-system is configured to obtain a second set of measurements based on the light received through the first polarizer. Next, the second polarizer only is disposed in the optical axis, and the second sub-system is configured to obtain a third set of measurements based on the light received through the second polarizer. The first, second and third sets of measurements are effective for characterizing the optical instrument.

The spectral response of the first sub-system is configured to be similar to the spectral response of the second sub-system.

The intensity of light is measured at the output of the detector for each angular rotation of the first polarizer with respect to the second polarizer and, thereby, obtain the first set of measurements.

The intensity of light is measured at the output of the instrument for each angular rotation of the first polarizer and, thereby, obtain the second set of measurements.

The intensity of light is measured at the output of the instrument for each angular rotation of the second polarizer and, thereby, obtain the third set of measurements.

The first, second and third sets of measurements are used to obtain extinction ratios of the first and second polarizers and the instrument, respectively. The extinction ratio of the instrument is determined independently of transmittance values and the extinction ratio values of the first and second polarizers.

The first, second and third sets of measurements are each based on (a) peak-to-peak variations of intensities of light and (b) mean values of the intensities of light at the output of the instrument.

Another embodiment of the present invention is a method of measuring polarimetric response of an optical instrument. The method includes the steps of:
  emitting light along an optical axis;
  receiving the light through first and second polarizers;
  filtering and detecting the light received through the first and second polarizers, using a filter and a detector;
  first measuring intensity of light received through the first and second polarizers;
  placing an optical instrument along the optical axis in lieu of the filter and detector;
  second measuring, using the optical instrument, intensity of light received through the first polarizer and without the second polarizer;

third measuring, using the optical instrument, intensity of light received through the second polarizer and without the first polarizer; and characterizing the optical instrument using the first, second and third measuring steps.

First measuring the intensity of light includes: angularly rotating the first polarizer with respect to the second polarizer, and measuring the light received through the first and second polarizers using the filter and detector.

Second measuring the intensity of light includes: replacing the filter and detector with the optical instrument; removing the second polarizer; angularly rotating the first polarizer with respect to the optical instrument; and measuring the light received through the first polarizer using the optical instrument.

Third measuring the intensity of light includes: replacing the filter and detector with the optical instrument; removing the first polarizer; angularly rotating the second polarizer with respect to the optical instrument, and measuring the light received through the second polarizer using the optical instrument.

Characterizing the optical instrument includes: obtaining extinction ratio of the optical instrument independently of transmittance values and extinction ratio values of the first and second polarizers.

Yet another embodiment of the present invention is a method of calibrating a polarimeter. The method includes the steps of:

first measuring intensities of light outputted from first and second polarizers disposed sequentially along an optical axis;

placing the polarimeter along the optical axis;

second measuring intensities of light outputted from the second polarizer, using the polarimeter, after removing the first polarizer;

replacing the second polarizer with the first polarizer; and third measuring intensities of light outputted from the first polarizer, using the polarimeter;

wherein the first, second and third measuring steps are effective in calibrating the polarimeter by obtaining three equations having three unknowns.

First measuring includes: detecting intensities of light outputted from a spectral filter and a detector placed sequentially along the optical axis. Also, the spectral filter has a spectral response similar to a spectral response of the polarimeter. Also included are angularly rotating the first polarizer with respect to the second polarizer, and measuring intensities of light outputted from the first and second polarizers using the spectral filter and detector.

First, second and third measuring steps include: outputting intensity values to a data collection system, and calculating an extinction ratio of the polarimeter, and calculating intensity values versus phase response of the polarimeter.

It is understood that the foregoing general description and the following detailed description are exemplary, but are not restrictive, of the invention.

BRIEF DESCRIPTION OF THE DRAWINGS

The invention may be best understood from the following detailed description when read in connection with the accompanying drawing. Included in the drawing are the following figures.

DETAILED DESCRIPTION OF THE INVENTION

There is a need to characterize the polarization sensitivity of an optical instrument with a specified level of calibration accuracy. A simple approach to characterizing the polarimetric response of an instrument is to place a linear polarizer between a source of known radiance and the aperture of the instrument, then rotate the polarizer through one or more angles while the instrument collects data. If the transmittance amplitude and the extinction ratio of the polarizer are known, the polarimetric response of the instrument may be determined.

There are two shortcomings to this simple approach. First, real linear polarizers are not perfect polarizers. While most of the light transmitted through the polarizer is of the desired polarization, the transmittance of the orthogonal polarization may not be zero. The ratio of transmittances of the two orthogonal polarizations is called the "extinction ratio". The extinction ratio may be very high, but uncertainty in its value introduces an error into the measured polarization response of the instrument. Second, the uncertainty in the transmittance amplitude of the desired polarization also introduces an error into the measured polarization response of the instrument.

The present invention eliminates the need to know the transmittance amplitude and extinction ratio of polarizers used to measure the polarimetric response of an optical instrument. The present invention does not require access to an exit port inside the optical instrument. All pieces of the test system are located at the instrument's aperture. Two linear polarizers and three sets of measurements, however, are required, as explained below.

Figure 1:
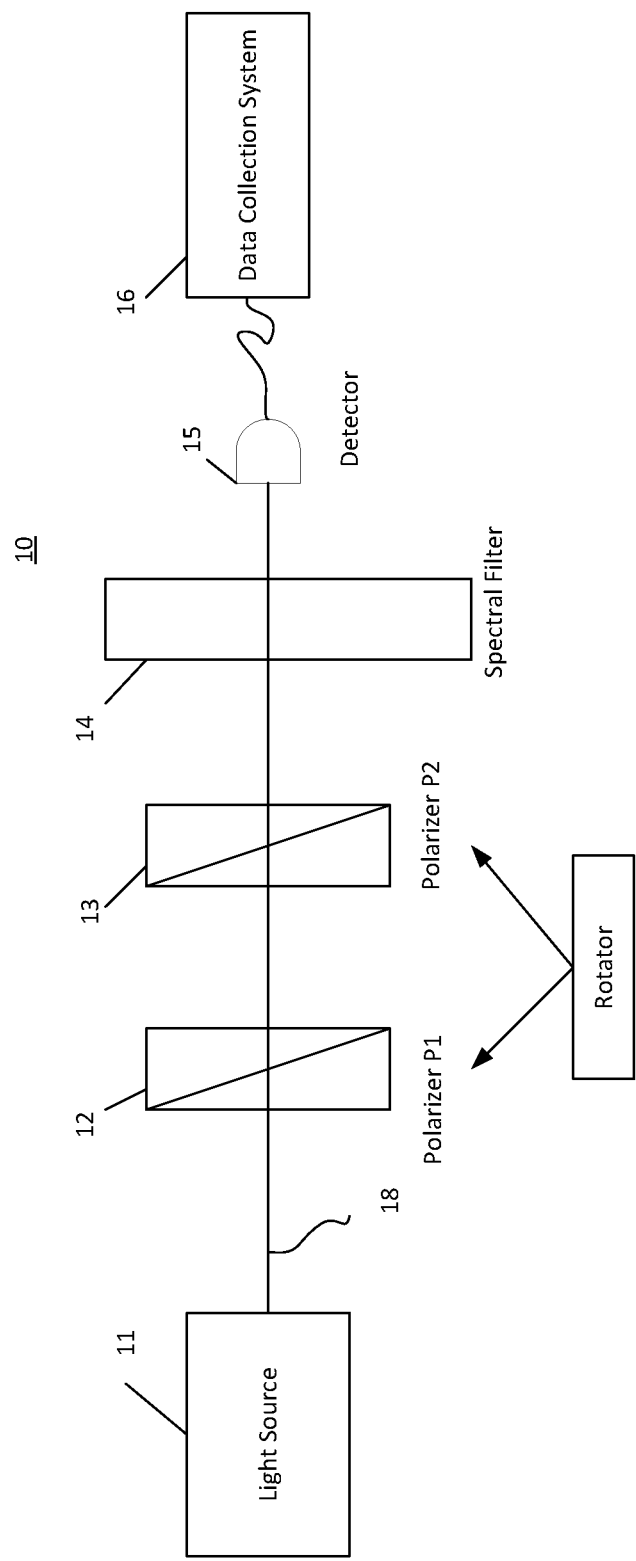
FIG. 1 is an optical schematic of a system for obtaining a first set of measurements required to implement the present invention.

An optical schematic of a test system for obtaining the first set of measurements is presented in FIG. 1. As shown, a test system 10 for obtaining the first set of measurements includes a light source 11; a polarizer P1 and a polarizer P2, respectively, designated 12 and 13; a spectral filter 14, a detector 15 and a data collection system 16. The polarization axis is assumed to be the same axis as optical axis 18.

Figure 2:
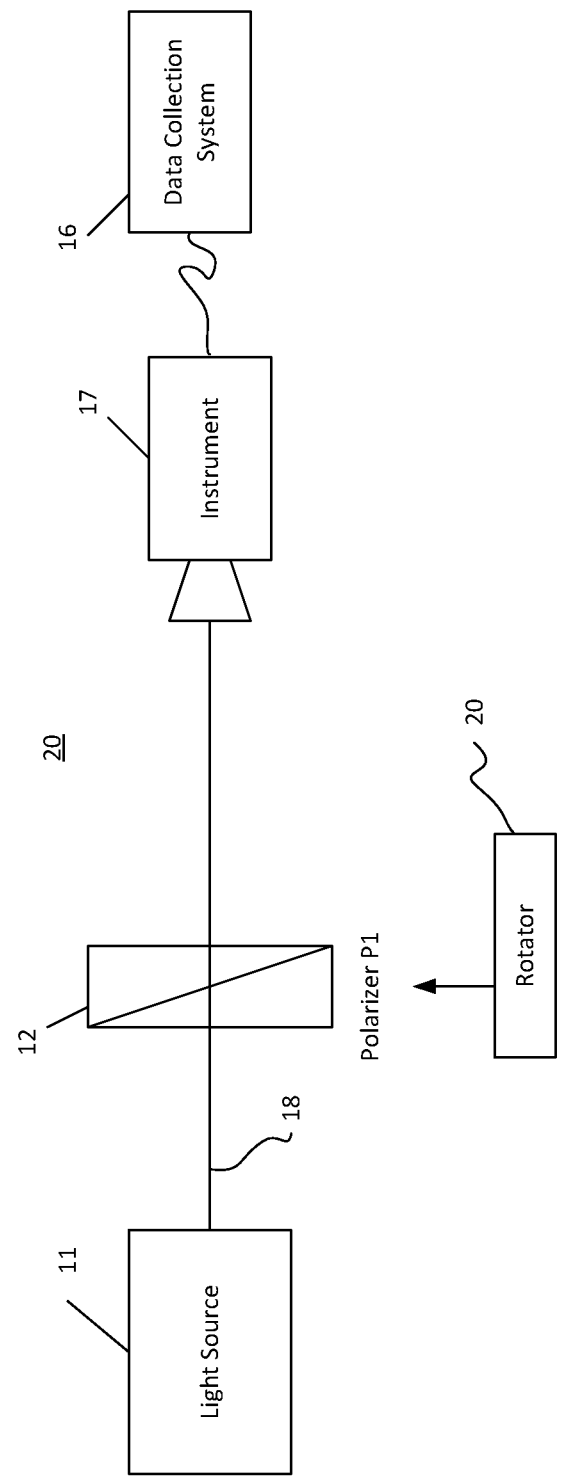
FIG. 2 is an optical schematic of a system for obtaining a second set of measurements required to implement the present invention.
Figure 3:
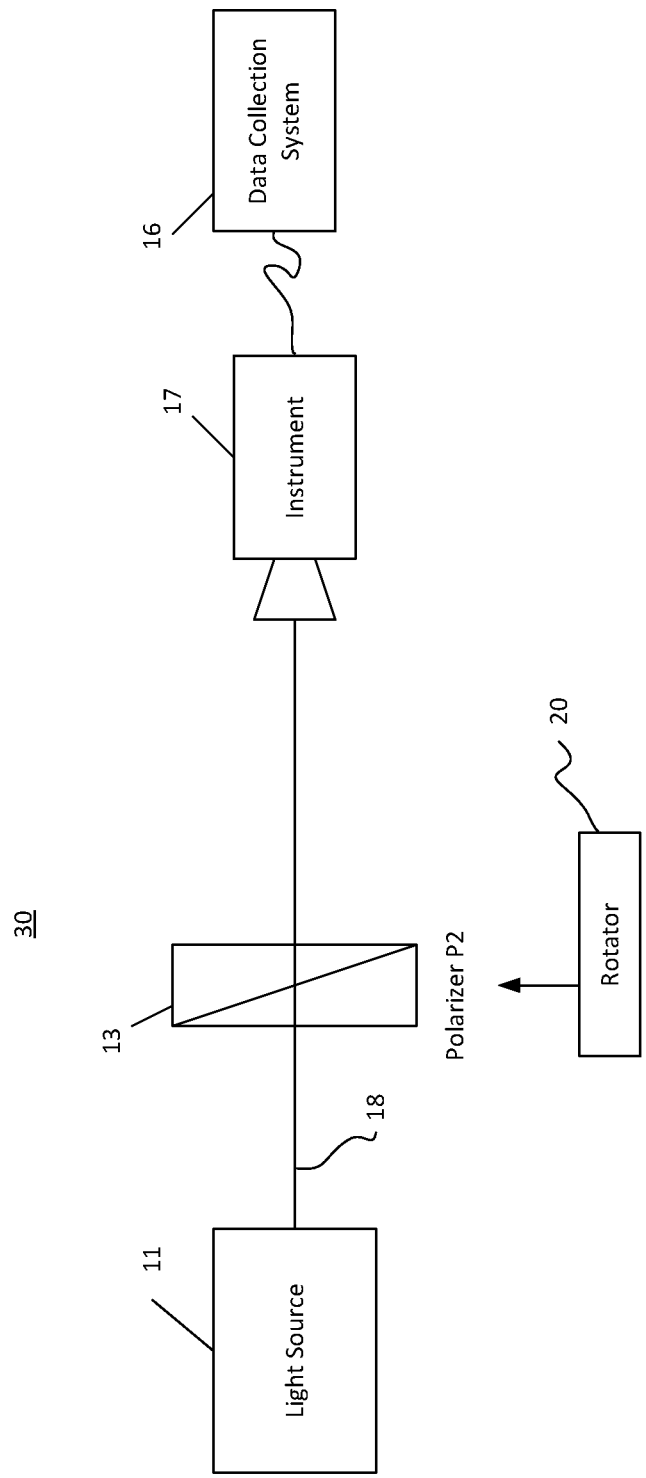
FIG. 3 is an optical schematic of a system for obtaining a third set of measurements required to implement the present invention.

The polarizer P1 is fixed in place. The polarizer P2 is held in a rotating stage so that its polarization axis may be rotated 360° with respect to the polarization axis of the first polarizer. The rotator 20 is shown schematically coupled to the polarizers, so that one polarizer may be rotated with respect to the other polarizer. The polarizers are followed by spectral filter 14 that has similar transmittance properties as the spectral filter in the instrument to be tested (FIGS. 2 and 3). Detector 15 follows the spectral filter and measures the transmitted light. All of the elements in test system 10 are aligned to be perpendicular to the direction of propagation of the light coming from light source 11 so that they do not introduce unintended changes in polarization of the transmitted light.

The detector output is measured with source 11 turned OFF to establish a zero level. Next, the source is turned ON and its intensity or amplitude is measured by the detector output as a function of the angular position of the polarization axis of the second polarizer. These measurements are collected for at least one full cycle of the polarization axis. Additional full cycles may be collected to improve the accuracy of the final result. After measuring a desired number of cycles, the source is once again turned OFF and the detector output is measured to determine the amount of drift, if any, of the zero level during the data collection. These measurements performed on the polarizers, which are shown in FIG. 1, provide a first set of measurements.

An optical schematic for another test system, designated as 21, for obtaining the second set of measurements is presented in FIG. 2. The polarizer P2 has been removed and filter 14 and detector 15 have been replaced with the optical instrument to be characterized. The optical instrument under test is shown designated as 17. The zero level is again characterized with source 11 turned OFF. Instrument data are then collected with the source turned ON while the polarizer is rotated through at least one full cycle. Another zero level is then collected.

The third set of measurements is identical to the second set, except that polarizer P1 is replaced by polarizer P2. This test system is shown designated as 30 in FIG. 3. As will be shown below, the three sets of measurements result in three equations with three unknowns.

The following description shows that normalizing the data from these three sets of measurements causes the transmittances of the polarizers to drop out. This leaves three independent measurements and three unknowns, namely, the extinction ratios of P1, P2 and the instrument 17. Thus, solving for the extinction ratio of the instrument 17 without knowing the extinction ratios of the polarizers is possible.

In order to characterize the polarimetric response of an instrument, an aspect of the invention needs to measure two quantities: the orientation of the polarization axis, $\phi$, and the extinction ratio, $\epsilon^2$. The Mueller matrix for a linear polarizer with amplitude transmittance $\tau$ is the following:

$$M(\tau, \varepsilon, \phi) = \frac{\tau^2}{2} \begin{bmatrix} 1+\varepsilon^2 & (1-\varepsilon^2)\cos2\phi & (1-\varepsilon^2)\sin2\phi & 0 \\ (1-\varepsilon^2)\cos2\phi & (1-\varepsilon)^2\cos^2 2\phi + 2\varepsilon & (1-\varepsilon)^2\sin2\phi\cos2\phi & 0 \\ (1-\varepsilon^2)\sin2\phi & (1-\varepsilon)^2\cos2\phi\sin2\phi & (1-\varepsilon)^2\sin^2 2\phi + 2\varepsilon & 0 \\ 0 & 0 & 0 & 2\varepsilon \end{bmatrix}$$

The Stokes vector of an unpolarized light source is the following:

$$S_0 = \begin{bmatrix} I_0 \\ 0 \\ 0 \\ 0 \end{bmatrix}$$

The Stokes vector of the light at the detector for the measurements described in the previous section is as follows:

$$S' = M(\tau_i, \epsilon_i, \phi_i) M(\tau_j, \epsilon_j, \phi_j) S_0$$

Multiplying the Stokes vector by the two Mueller matrices and simplifying the result gives the intensity of the light at the detector, as follows:

$$I' = \frac{1}{4} I_0 \tau_i^2 \tau_j^2 \{(1+\varepsilon_i^2)(1+\varepsilon_j^2) + (\varepsilon_i^2 - 1)(\varepsilon_j^2 - 1)\cos[2(\phi_i - \phi_j)]\}$$

This intensity equation has the following form:

$$I'_{i,j} = A_{i,j} \cos[2(\phi_i - \phi_j)] + B_{i,j}$$

where $A_{i,j}$ is the peak-to-peak variation of the measurements, and
$B_{i,j}$ is the mean of the measurements.
Calculating the contrast of the peak-to-peak variation produces the following:

$$C_{i,j} = \frac{A_{i,j}}{B_{i,j}} = \frac{(\varepsilon_i^2 - 1)(\varepsilon_j^2 - 1)}{(1+\varepsilon_i^2)(1+\varepsilon_j^2)}$$

which is independent of the transmittance of either element. The contrast may be calculated for each of the three sets of measurements, after first subtracting the dark levels from the data. This provides the following three measurements:

$$[C_{1,2}, C_{1,3}, C_{2,3}]$$

and the following three unknowns:

$$[\epsilon_1, \epsilon_2, \epsilon_3]$$

It is now possible to solve for any of the extinction ratios. The subscripts (1, 2 and 3) refer to P1, P2 and instrument 17, respectively. Combining the three equations for contrast provides the following:

$$C_{1,2} = \frac{C_{1,3}(1+\varepsilon_3^2)}{(1-\varepsilon_3^2)} \frac{C_{2,3}(1+\varepsilon_3^2)}{(1-\varepsilon_3^2)}$$

and $$\frac{(1+\varepsilon_3^2)}{(1-\varepsilon_3^2)} = \sqrt{\frac{C_{1,2}}{C_{1,3} C_{2,3}}}$$

Solving for $\epsilon_3$ provides the following:

$$\varepsilon_3^2 = \frac{\sqrt{C_{1,2}} - \sqrt{C_{1,3} C_{2,3}}}{\sqrt{C_{1,2}} + \sqrt{C_{1,3} C_{2,3}}}.$$

It may easily be verified that $$\sqrt{C_{1,2}} > \sqrt{C_{1,3} C_{2,3}}$$

Thus, $\epsilon_3$ is a real quantity, as required. Therefore, the extinction ratio of the instrument may be determined independently of the transmittances and extinction ratios of the two polarizers.

Next, the instrument's polarization axis may be determined by recording the angle of the polarization axis of the polarizer, as it rotates. The phase of the resulting detected signal from the instrument may then be measured.

It will be recalled that the detected signal for the third set of measurements has the following form:

$$I'_{1,3} = A_{1,3} \cos[2(\phi_1 - \phi_3)] + B_{1,3}$$

where $\phi_1$ is the rotating angle of the P1 polarization axis, and $\phi_3$, is the unknown polarization axis of the instrument.

Similar to the instrument's extinction ratio, the polarization axis of the instrument is independent of the polarizer transmittance and extinction ratio. As the above equation shows, the polarization axis of the instrument only depends on knowing the polarization axis of the polarizer P1.

It will be appreciated that the amplitude and phase of the cosine term shown in the above equation may be determined in different manners, including direct measurement, Fourier transform measurement and correlation methods.

Accordingly, the present invention may be used to characterize any optical instrument that is sensitive to the polarization of incoming light. The characterization may be completed without having to know the extinction ratios or the transmittance properties of polarizers placed in the optical path during calibration of the instrument. The present invention may be used to characterize the response of any instrument, or any optical system or element to any combination of linearly and randomly polarized light. The present invention may also be used to demonstrate that a radiometer is insensitive to polarization to within a specified accuracy. The present invention may also be used to characterize and calibrate the response of a polarimeter and may be used to characterize the polarization of light produced by an unknown illumination source.

It will be appreciated that many polarization characterization methods use a quarter-wave plate, while the present invention does not. An advantage of not using a quarter-wave plate is that it allows polarimetric characterization of an instrument that has a wide spectral bandwidth. Quarter-wave plates only work over a narrow spectral band. Without a quarter-wave plate, the present invention does not measure system sensitivity to circular polarization. However, the fact that it does not measure sensitivity to circular polarization does not matter for many applications.

It will be understood that the system shown in FIGS. 1, 2 and 3 may include a third polarizer P3, a spectral filter, and a detector, in which case the present invention may measure the extinction ratios of all three polarizers, independently of the polarizer transmittances.

These general and specific aspects of the present invention may be implemented using a system, a method, a computer program, a computer readable medium, or an apparatus or any combination of systems, methods, computer programs, computer readable mediums, and/or apparatuses.

As shown by the above discussion, functions relating to the data collection system 16 (FIGS. 1-3) may be implemented on computers connected for data communication.

As known in the data processing and communications arts, a general-purpose computer typically comprises a central processor or other processing device, an internal communication bus, various types of memory or storage media (RAM, ROM, EEPROM, cache memory, dis drives etc.) for code and data storage, and one or more network interface cards or ports for communication purposes. The software functionalities involve programming, including executable code as well as associated stored data, e.g. files used for enriching the call records. The software code is executable by the general-purpose computer that functions as the data collection system 16. In operation, the code is stored within the general-purpose computer platform. At other times, however, the software may be stored at other locations and/or transported for loading into the appropriate general-purpose computer system. Execution of such code by a processor of the computer platform enables the platform to implement the methodology discussed and illustrated herein.

Figure 4:
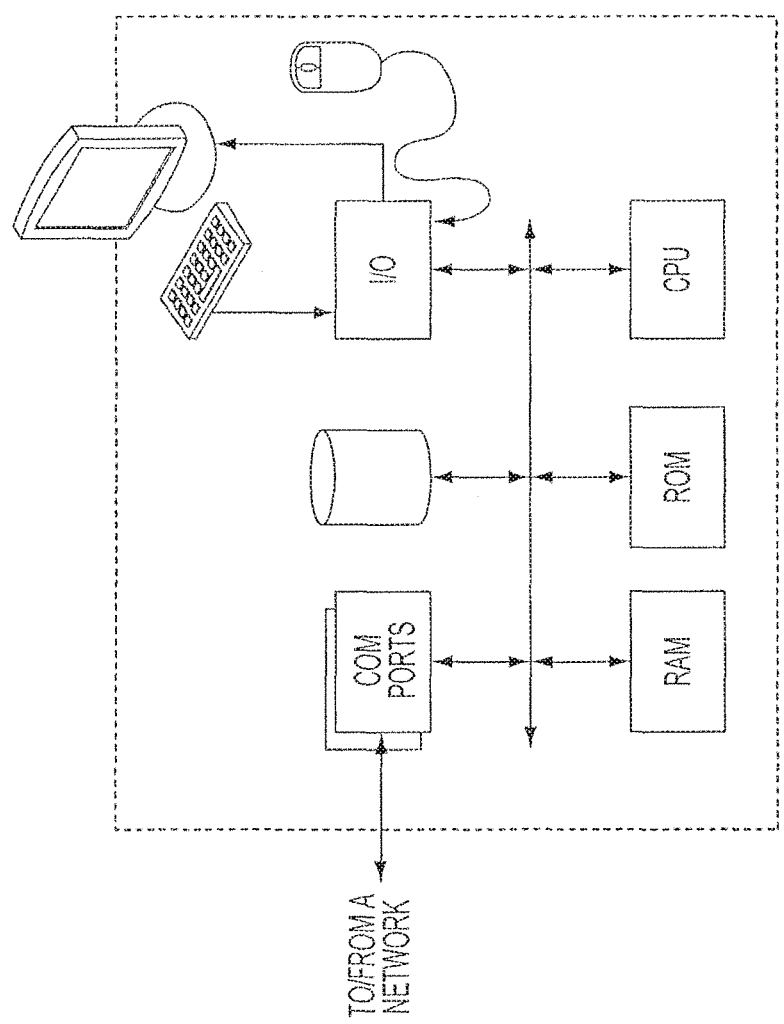
FIG. 4 is a functional block diagram of a general purpose computer hardware platform that may be included in the data collection system shown in FIGS. 1-3.

FIG. 4 provides a functional block diagram illustrating a general-purpose computer hardware platform. FIG. 4 illustrates a computer with user interface elements, as may be used to implement a personal computer or other type of work station, or terminal device, although the computer of FIG. 4 may also act as a server, if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user's terminal device, such as a PC or tablet computer, similarly includes a data communication interface, CPU, main memory and one or more mass storage devices for storing user data and the various executable programs. The various types of user terminal devices will also include various user input and output elements. A computer, for example, may include a keyboard and a cursor control/selection device such as a mouse, trackball, joystick or touchpad; and a display for visual outputs.

Common forms of computer-readable media include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

What is claimed:

1. A method of calibrating a polarimeter comprising the steps of:
    passing light through a first and a second polarizer disposed sequentially along an optical axis:
    measuring an intensity of light output from the second polarizer by a detector coupled to a data collection system;
    collecting the measured an intensity of light by a data collection system as first measured data:
    placing the polarimeter along the optical axis;
    removing the first polarizer from the optical axis;
    measuring an intensity of light output from the second polarizer, using the polarimeter coupled to a data collection system, after removing the first polarizer;
    collecting by the data collection system the intensity measured by the polarimeter as second measured data;
    replacing the second polarizer with the first polarizer along the optical axis; and
    measuring intensity of light output from the first polarizer after replacing the second polarizer with the first polarizer, using the polarimeter coupled to the data collection system;
    collecting by the data collection system the intensities measured by the polarimeter after replacing the second polarizer with the first polarizer as third measured data;
    using the first, second and third measured data to determine an extinction ratio of the polarimeter, calibrating the polarimeter;
    calibrating the polarimeter based on the determined extinction ratio.

2. The method of claim 1 wherein measuring intensity of light output from the second polarizer includes:
    positioning along the optical axis a spectral filter and a detector in sequence after the second polarizer;
    detecting by the detector the intensity of light output from the spectral filter,
    wherein the spectral filter has a spectral response similar to a spectral response of the polarimeter and the detector is coupled to the data collection system.

3. The method of claim 2 wherein measuring intensities of light output from first and second polarizers further includes:
    angularly rotating the first polarizer with respect to the second polarizer,
    recording an angle of a polarization axis of the first polarizer as the first polarizer is rotated, and
    measuring, by the data collection system, an intensity of light output at the recorded angle of the polarization axis of the first polarizer from the first polarizer, second polarizer, and the spectral filter; and
collecting the recorded angle and measured intensity by the data collection system.

4. The method of claim 1 wherein calibrating the polarimeter includes:
    determining the extinction ratio of the optical instrument independently of transmittance values and extinction ratio values of the first and second polarizers based on the first, second and third measured data.

5. The method of claim 1, further comprising wherein the second and third measuring steps include:
    obtaining from the second and third measured data measurement data having (a) peak-to-peak variations of intensities of light and (b) mean values of the intensities of light at the output of the polarimeter, and
    using the obtained measurement value to calibrate the polarimeter.

6. The method of claim 1 wherein the first, second and third measuring steps include:
    calculating intensity values versus phase response of the polarimeter.

* * * * *